(12) United States Patent  
Spencer et al.

(10) Patent No.: US 7,900,393 B2  
(45) Date of Patent: Mar. 8, 2011

(54) LANDSCAPE MATERIAL AND METHOD FOR MAKING SAME

(75) Inventors: John W Spencer, Columbus, OH (US); Ralph T Spencer, Jacksonville, FL (US)

(73) Assignee: Mulch Manufacturing, Inc., Reynoldsburg, OH (US)

( * ) Notice: Subject to any disclaimer, the term of this patent is extended or adjusted under 35 U.S.C. 154(b) by 651 days.

(21) Appl. No.: 11/624,319

(22) Filed: Jan. 18, 2007

(65) Prior Publication Data

US 2007/0163169 A1     Jul. 19, 2007

Related U.S. Application Data

(60) Provisional application No. 60/760,194, filed on Jan. 18, 2006.

(51) Int. Cl.
*A01G 7/00* (2006.01)
(52) U.S. Cl. ............................................... 47/9
(58) Field of Classification Search ................... 47/9
See application file for complete search history.

(56) References Cited

U.S. PATENT DOCUMENTS

| 5,301,460 | A | * | 4/1994 | Corbitt ................................ 47/9 |
| 6,101,762 | A | * | 8/2000 | Courtabessis et al. .............. 47/9 |
| 2004/0035048 | A1 | * | 2/2004 | Dooley et al. ....................... 47/9 |
| 2005/0139155 | A1 | * | 6/2005 | Spencer et al. ............... 118/256 |
| 2007/0163169 | A1 | * | 7/2007 | Spencer et al. ..................... 47/9 |

OTHER PUBLICATIONS

Photograph of prior art excelsior-making machines, photo taken by Applicants, and machines believed to be in public use before January of 2005.

* cited by examiner

*Primary Examiner* — Francis T Palo
(74) *Attorney, Agent, or Firm* — Krugliak, Wilkins, Griffiths & Dougherty Co., L.P.A.; Edward T. Kennedy

(57) ABSTRACT

A landscape material includes a plurality of fibers. Each of the fibers includes a generally uniform length, such as in a range of from about 3.0 inches to about 10.0 inches, and a generally uniform cross sectional area, so that the landscape material generally is lighter in weight and more uniform in appearance than landscape material of the prior art. The landscape material optionally includes an additive such as a colorant. A method for making landscape material is also provided. The method includes the steps of providing a wood section and cutting the wood section into a plurality of ribbons. Each of the ribbons has a generally uniform cross sectional area, and the ribbons are reduced to fibers, each of which has a generally uniform length.

6 Claims, 5 Drawing Sheets

LANDSCAPE MATERIAL AND METHOD FOR MAKING SAME

CROSS-REFERENCE TO RELATED APPLICATION

This application claims the benefit of U.S. Provisional Patent Application Ser. No. 60/760,194, which was filed on Jan. 18, 2006.

BACKGROUND OF THE INVENTION

1. Technical Field

The invention relates to the art of landscape materials and methods for making such materials More particularly, the invention relates to a method for making a landscape material, such as mulch, in a thinner and generally more uniform form than prior art mulch, which produces desirable characteristics in the resulting landscape material.

2. Background Art

In the landscape industry, natural fibrous material, such as mulch, is often placed around buildings, bushes, trees, stones, and other items. The mulch is typically made by grinding wood down to relatively small fibers. The wood that is used to make the mulch may be obtained from several different sources, including newly-cut trees, lumber, and scrap wood, such as old shipping pallets More particularly, in the prior art, generally large pieces of wood are placed in the feed hopper of a wood chipper or grinder, or on a conveyor leading into the grinder. The feed hopper or conveyor leads to the cutting chamber of the grinder, which includes multiple rotating heavy-duty teeth. Each large piece of wood is fed into the cutting chamber of the grinder from the feed hopper or conveyor, and the rotating teeth shred and cut the wood until it is reduced to small chunks, or mulch fibers.

Typically, a screen is placed over the exit area of the grinder, which keeps the wood in the cutting chamber of the grinder until it is reduced to a size that will pass through the openings in the screen. Depending on the size and configuration of the openings in the screen, the mulch fibers that are produced may be relatively large and coarse, or relatively small and fine. For example, each opening in a screen that is configured for coarse grinding is relatively large, such as from about 1.5 to about 2.5 inches in diameter, while each opening in a screen that is configured for fine grinding is relatively small, such as about 0.25 inches in diameter. Thus, coarse mulch may be up to about 0.5 inches in diameter, and is normally up to about 3.0 to about 4.0 inches long, while fine mulch may be up to about 0.25 inches in diameter, and is normally up to about 2.0 to 3.0 inches long. However, it is important to note that the random shredding and tearing of the wood by the teeth in the grinder results in fibers that are not uniform. That is, the resulting mulch fibers may have a maximum diameter as determined by the size of the openings in the exit screen, but the fibers are often below that maximum diameter due to the splintering of the wood as it is shredded and torn by the grinder teeth. As a result, both coarse mulch fibers and fine mulch fibers of the prior art typically randomly range in diameter and length. It is to be noted that reference herein to diameter for a cross-sectional measurement of mulch fibers is for the purpose of convenience, as such cross-sections include shapes other than those that are round, such as rectangular, square, random, etc., and all such cross-sectional shapes are included herein.

Coarse mulch and fine mulch, and particularly the fine mulch, are well-known in the art and typically are placed around bushes, plants, trees, and other items. A finer size range for mulch is desirable around bushes, plants and trees, as the mulch retains soil moisture, thereby encouraging growth of the bush, plant or tree, and inhibits weed growth. Specifically, a more fine-sized mulch enables easier placement of the mulch around bushes, plants and trees, which in turn provides increased coverage of the soil to retain more soil moisture, and to provide increased inhibition of weed growth. The finer-sized mulch is also softer to the touch than more coarse fibers, and is thereby more desirable to certain users. In addition, the finer mulch fibers often have a more desirable appearance than mulch with more coarse fibers. It should also be noted that finer mulch fibers that are more uniform in size are often more desirable to users, since the uniform fibers are often easier for a user to handle, and have a mole desirable appearance than fibers which vary greatly in size To continue to increase the favorable properties of fine mulch fibers, it is desirable to reduce the cross-sectional area of the prior-art fine fiber size even more, and to create a more uniformly sized mulch fiber, while retaining enough fiber size to allow the mulch to be easily handled and resist premature decomposition. More particularly, if the prior-art fiber size is altered in a disadvantageous manner, the cross-sectional area and/or length of the mulch fibers may become too small, creating fibers that are difficult for a user to handle, may decompose prematurely, and/or may blow away If the cross-sectional area and/or length of the mulch fibers becomes too large, fibers would be created that are difficult for a user to spread and/or may be visually unappealing. Grinding machines of the prior art, due to their use of multiple rotating teeth to chip away at wood, typically produce such undesirable mulch fibers if they are used to attempt to reduce the size of the mulch beyond the typical prior-art non-uniform fine fiber size.

As a result, a need exists to decrease the cross sectional area of prior-art mulch fibers and to create mulch fibers that are more uniformly sized, in order to increase the desirable characteristics of the mulch, such as increased placement ability, increased softness, and a desirable appearance, without undesirably creating a mulch that is difficult to handle, or decomposes prematurely. The present invention satisfies this need by providing a landscape material with such decreased cross-sectional area and increased generally uniform size, and a method for making that material.

SUMMARY OF THE INVENTION

An objective of the present invention is to provide a landscape material with fibers that have a generally decreased cross-sectional area when compared to the cross-sectional area of fibers of prior art landscape material Another objective of the present invention is to provide a landscape material with fibers that have a generally uniform size and shape.

Yet another objective of the present invention is to provide a method of making landscape material that has fibers that have a generally decreased cross-sectional area when compared to the cross-sectional area of fiber's of prior art landscape material, and have a generally uniform size and shape These objectives and advantages are obtained by the landscape material of the present invention. In an exemplary embodiment of the invention, the landscape material includes a plurality of fibers. Each of the fibers includes a generally uniform length, such as in a range of from about 3.0 inches to about 10.0 inches, and a generally uniform cross sectional area, so that the landscape material generally is lighter in weight and more uniform in appearance than landscape material of the prior art. The landscape material of optionally includes an additive such as a colorant.

These objectives and advantages are also obtained by the method of making landscape material of the present invention. In an exemplary embodiment of the invention, the method includes the steps of providing a wood section and cutting the wood section into a plurality of ribbons, with each ribbon having a generally uniform cross sectional area. The ribbons are reduced to fibers, each of which has a generally uniform length, such as in a range of from about 3.0 inches to about 10.0 inches

BRIEF DESCRIPTION OF THE DRAWINGS

The preferred embodiment of the present invention, illustrative of the best mode in which applicants have contemplated applying the principles, is set forth in the following description and is shown in the drawings, and is particularly and distinctly pointed out and set forth in the appended claims.

Similar numerals refer to similar parts throughout the drawings

DESCRIPTION OF THE PREFERRED EMBODIMENTS

Figure 1:
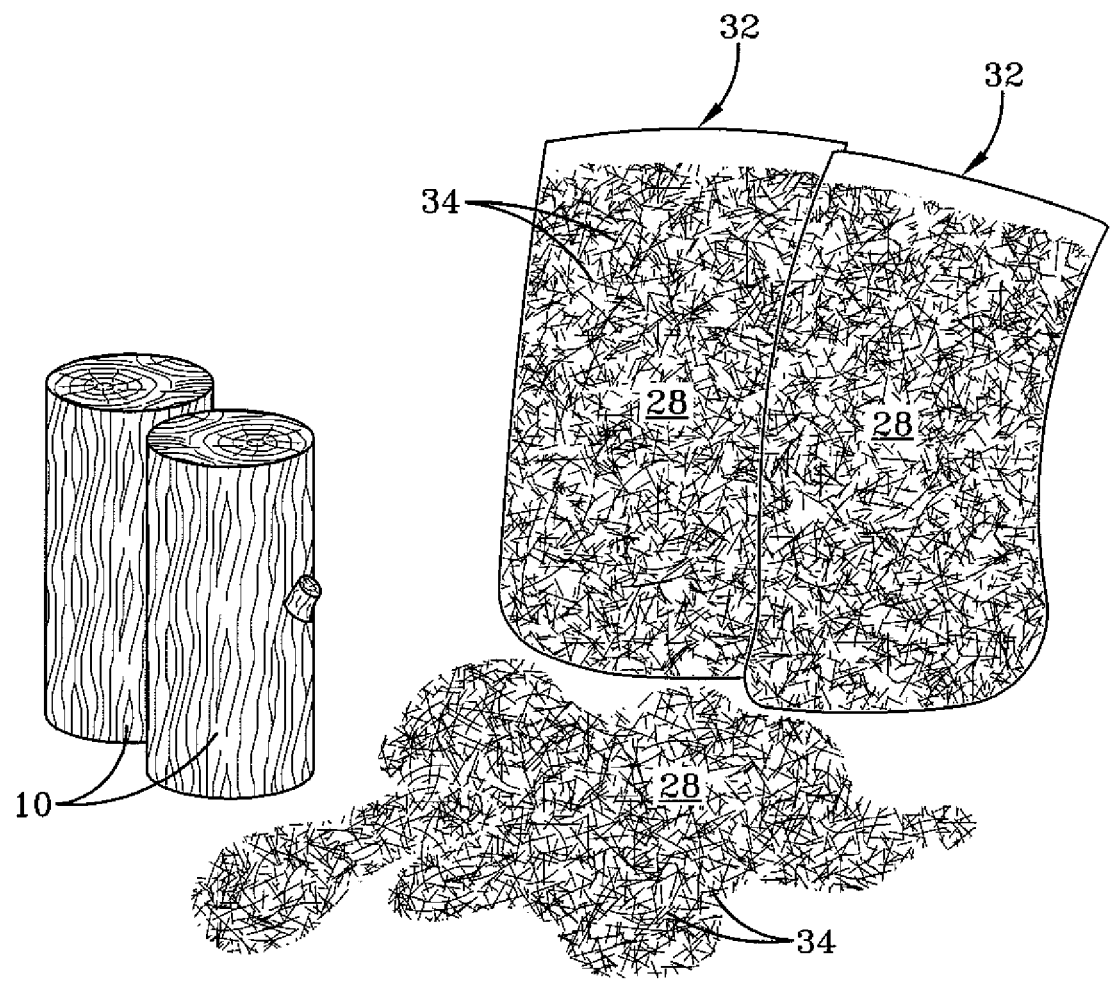
FIG. 1 is a perspective view of wood sections used to make the landscape material of the present invention, along with bags of the landscape material of the present invention and an unbagged pile of the landscape material of the present invention.
Figure 2:
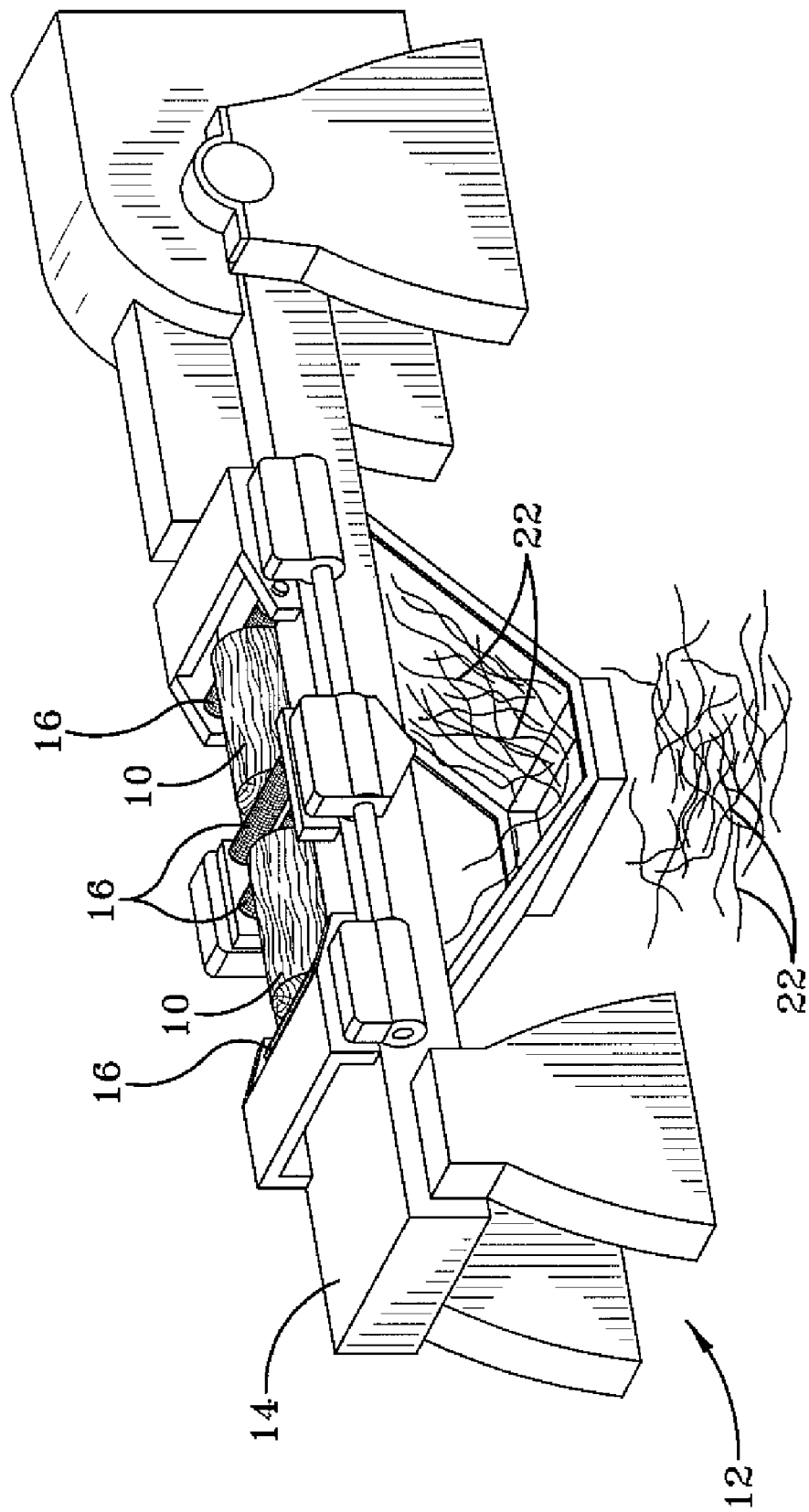
FIG. 2 is a perspective view of exemplary machinery used to process wood sections to manufacture wood ribbons for the landscape material of the present invention.
Figure 3:
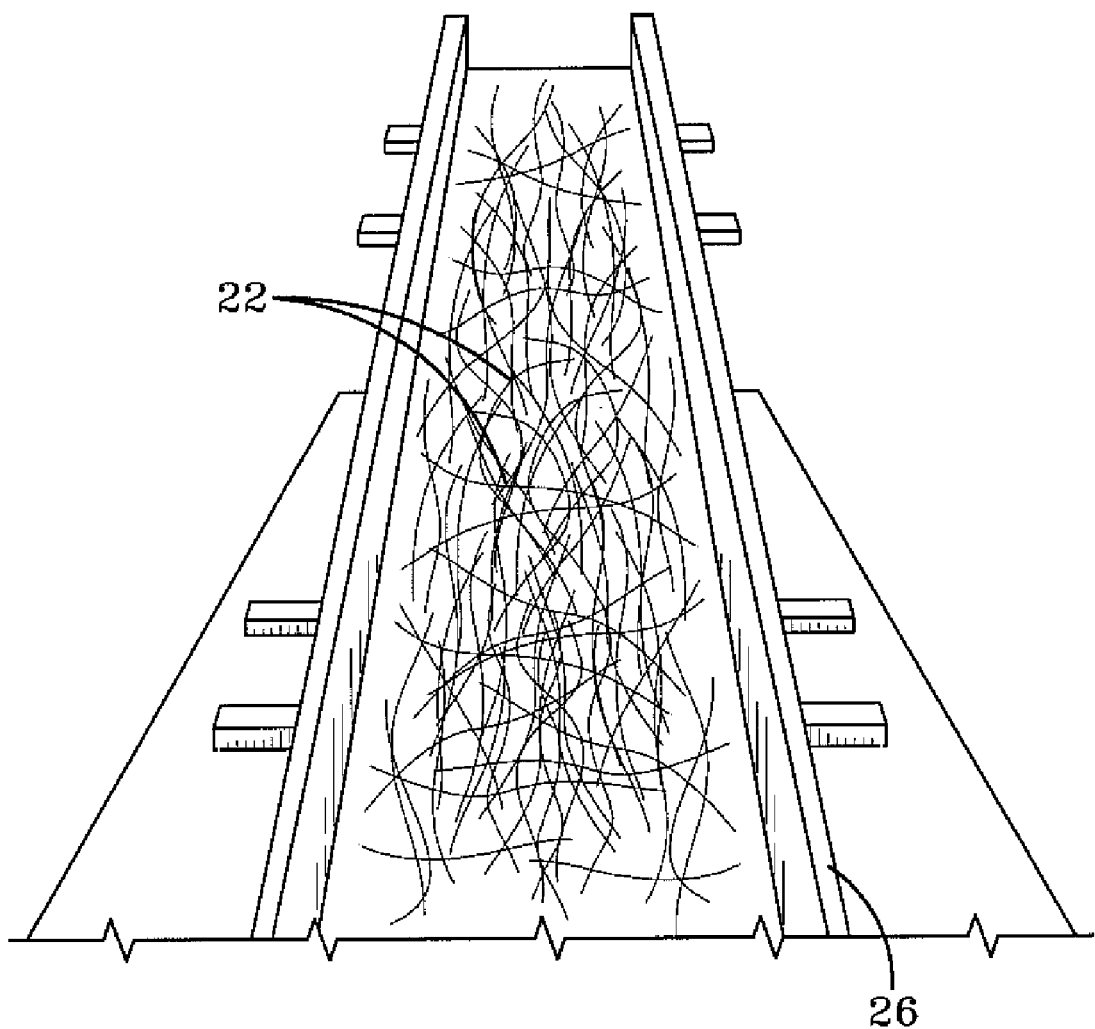
FIG. 3 is a perspective view of wood ribbons for the landscape material of the present invention being conveyed away from the machinery shown in FIG. 2.

Turning now to FIG. 1, a section of wood cut from a tree, which is one of the types of wood used to make the mulch fibers of the invention, is indicated at 10. With additional reference to FIG. 2, wood section 10 is placed on a processing machine 12. More particularly, exemplary processing machine 12 is known in the art as an excelsior machine, and has typically been used in the prior art to manufacture wood curls or ribbons, known as excelsior, which have been used as a packaging material, and have been used in other cushioning-related applications, such as to fill mattresses. These excelsior wood curls or ribbons of the prior art have been about 21.0 inches long, which is advantageous for their use as a packaging and packing material. As will be described below, however, the landscape material of the present invention is different from the prior art excelsior packaging and packing material Wood section 10 is placed between roller clamps 16 of processing machine 12, and is secured against a cutting table 14 by the roller clamps. Cutting table 14 moves longitudinally under wood section 10 in a reciprocal manner, thereby sliding a knife (not shown) in the table against the wood section in a back-and-forth action The knife preferably includes a blade that, in one direction, includes multiple teeth, and in an opposite direction, includes a flat edge. Such a blade design enables the multiple teeth to cut wood ribbons 22 from wood section 10 while table 14 moves in a first direction, as well as to create a grooved surface on the wood section after moving in the first direction, so that the flat edge of the blade cuts additional ribbons from the grooved surface when the table moves in a second, reciprocal direction With particular reference now to FIGS. 2 and 3, wood ribbons 22 drop beneath the cutting knife on table 14 to a take-away conveyor 26, which preferably conveys the ribbons from processing machine 12 to be colored and reduced in length, as will be described in greater detail below. Upon removal from processing machine 12, wood ribbons 22 are of a generally uniform diameter which, as an example, may be from about 0.0625 inches to about 0.125 inches As mentioned above, reference herein to diameter for a cross-sectional measurement is for the purpose of convenience, and includes cross-sectional shapes that are rectangular, square, random, etc. For example, wood ribbons 22 may include a rectangular cross-sectional shape, in which case the fibers may be on the order of about 0.125 inches wide and about 0.0625 inches thick. As a result, ribbons 22 thus have a generally uniform cross-sectional area.

It should be noted that the use of excelsior machine 12 to create ribbons 22 for landscape material 28 of the present invention is by way of example, as any other means and/or methods known to those skilled in the art may be used to create the landscape material without affecting the overall concept or operation of the invention For example, rotary cutters utilizing a slicing knife that travels in a circular pattern about wood section 10 may be employed. As will be described in greater detail below, the generally uniform size of the fibers of landscape material 28 desirably increases the characteristics of the material beyond prior-art landscape materials.

Figure 4:
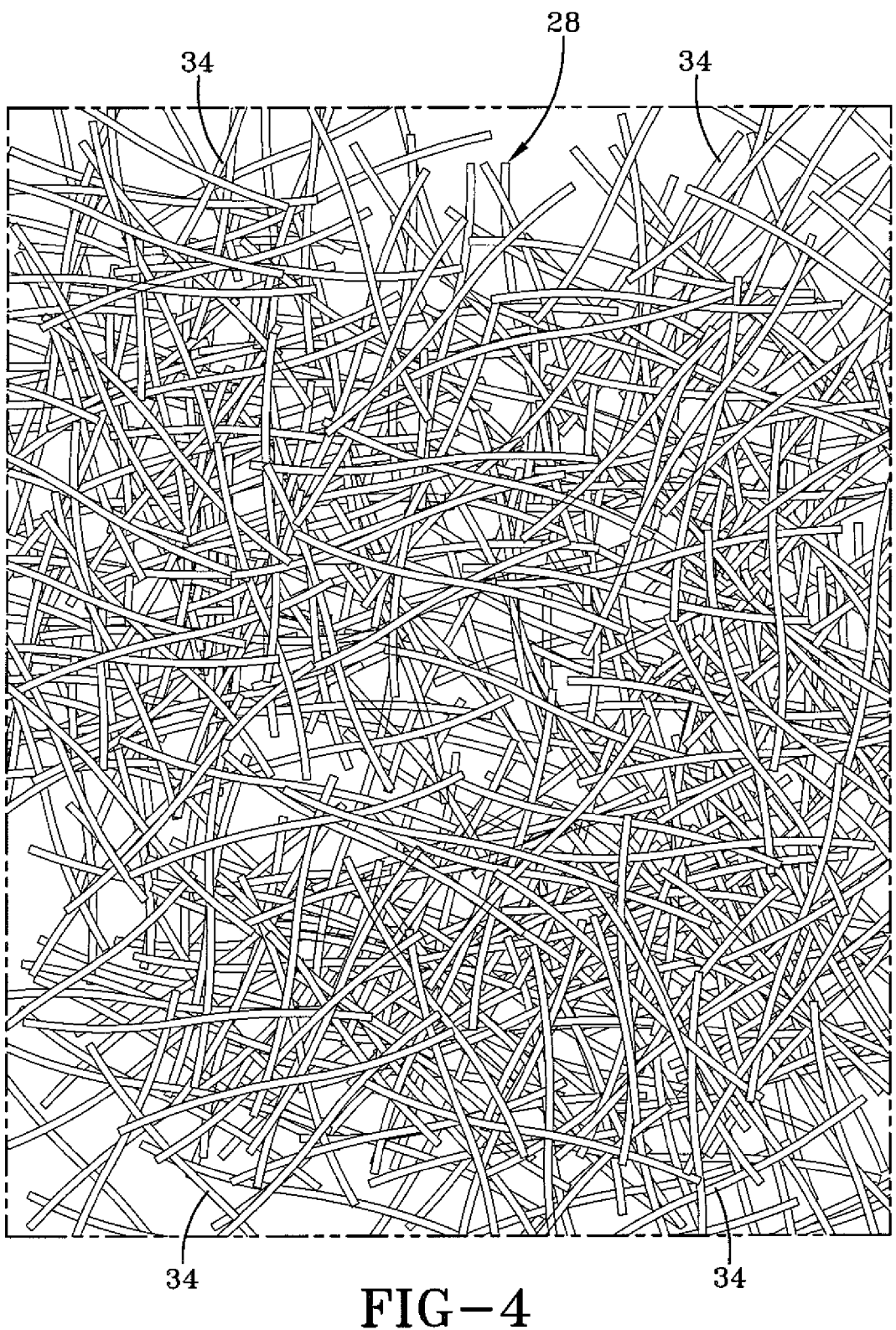
FIG. 4 is a close-up perspective view of a portion of a pile of fibers of the landscape material of the present invention.

Once ribbons 22 are formed as described above, they preferably are also colored and reduced in length to form the landscape material of the present invention, which is shown in FIG. 4 and indicated generally at 28. Artificial coloring of landscape material 28 results in a much more visually pleasing and thus desirable product For example, artificial coloring allows landscape material 28 to be more uniform in appearance, and enables different colors of mulch to be produced, such as various shades of tan, brown, red or black, which often appeal to the preferences of certain users Of course, due to use of landscape material 28 around bushes, plants, trees, and the like, such artificial coloring preferably is non-toxic. To accomplish artificial non-toxic coloring of landscape material 28, various processes may be used. It is to be noted that any of the coloring methods known in the art may used, including coloring techniques using solid or liquid colorants, and apparatus such as baths, sprays, trommels, submersers, impregnation rollers and the like.

For example, wood ribbons 22 may be conveyed into a rotating drum, which tumbles the ribbons, while liquid colorant is dispersed on the ribbons in the rotating drum via a spray bar that extends into the drum. The use of the rotating drum and spray bar are more fully described in a separate application filed on Dec. 29, 2004, having Ser. No. 11/025,701, and assigned to the same assignee as the present invention, Mulch Manufacturing, Inc. Of course, as mentioned above, other methods for coloring ribbons 22 may be used, such as placing the ribbons into a non-moving chamber and then moving the ribbons with paddles or an auger while colorant is delivered into the chamber, or by immersing the ribbons in a liquid coloring bath and removing excess liquid by mechanical means. It should be noted that additives other than colorant may be imparted to ribbons 22, such as flame retardants or horticultural chemicals, which may include insecticides, herbicides and the like.

Following the addition of colorant or other additives, wood ribbons 22 are reduced in length to form fibers 34. It should be noted that, alternatively, ribbons 22 may be reduced in length to form fibers 34 before the addition of colorant or other additives without affecting the overall concept or operation of the invention. Preferably, a length-reducing machine is utilized to cut wood ribbons 22 into fibers 34 having a length that generally is within a range of from about 3.0 inches to about 10.0 inches. More preferably, the length-reducing machine cuts ribbons 22 into fibers 34 having a length that generally is within a range of from about 4.0 inches to about 6.0 inches. Of course, depending on the particular application, other lengths of fibers 34 may be cut, such as fibers that generally are shorter than 3.0 inches or longer than 10.0 inches. Moreover, it is anticipated that certain ones of ribbons 22 may pass through the length-reducing machine without being cut or significantly reduced in length, which occasionally happens as is known to those skilled in the art, in which case certain fibers 34 may be up to about 21.0 inches long. The length-reducing machine that is used to cut wood ribbons 22 into fibers 34 may be any cutter or grinders as known in the art. For example, a grinder having a rotary drum with knives or hammers may be used Following the addition of colorant or other additives to wood ribbons 22 and cutting of the wood ribbons to form fibers 34 of landscape material 28, as described above, the landscape material optionally may be dried using any drying means known to those skilled in the art. For example, a heated drying system such as a rotary or tumble dryer with heated air may be used to dry landscape material 28.

Figure 5:
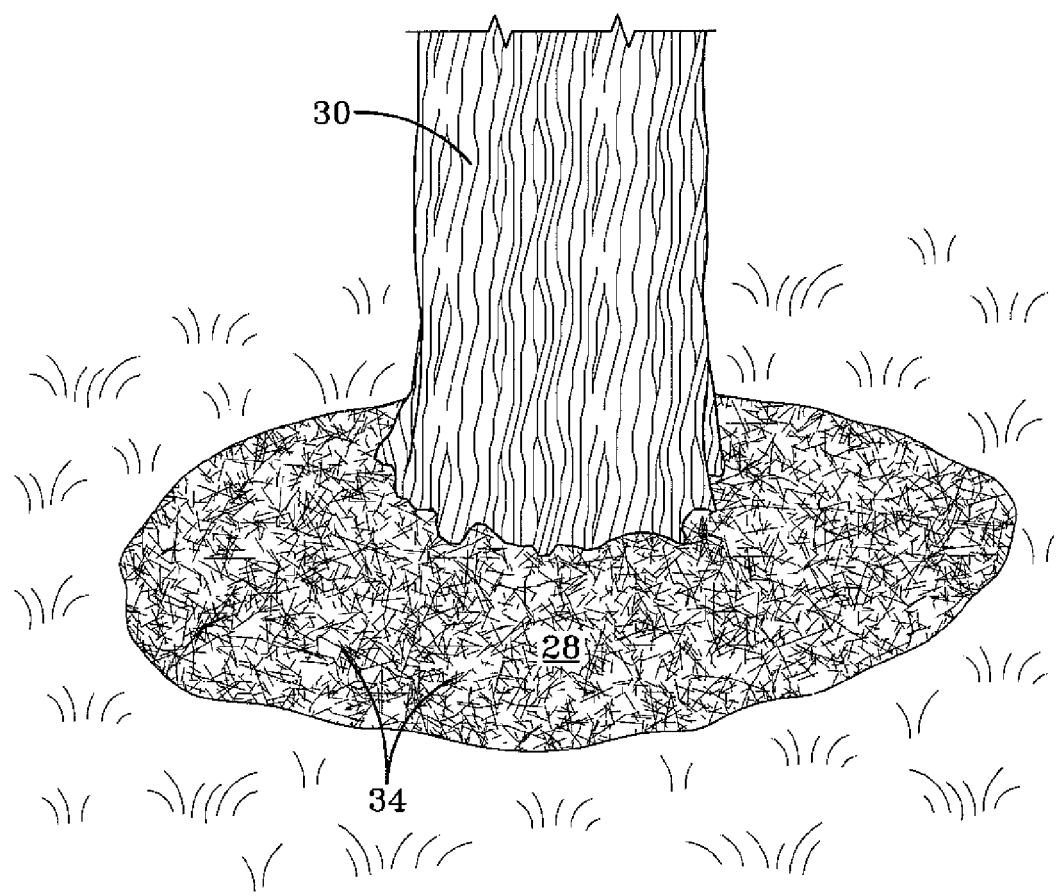
FIG. 5 is a perspective view of the landscape material of the present invention in use around a tree.

Once landscape material 28 is colored, cut, and optionally dried, it is ready for placement around buildings, bushes, plants, trees, stones, and other items. For example, as shown in FIG. 5, landscape material 28 may be placed around a tree 30. Fibers 34 of landscape material 28 of the present invention are thinner and generally more uniformly sized, yet are as long or longer, than the fine-sized mulch of the prior art, thereby increasing the placement ability of the fibers of the landscape material of the invention over that of the prior art mulch fibers. This placement ability enables landscape material 28 of the present invention to provide increased coverage of the soil around tree 30, which desirably retains the moisture in the soil and reduces the ability of weeds to grow around the tree In addition, when landscape material of the present invention 28 is placed around a plant, the above-described size and shape of fibers 34 desirably allows water to pass through the fibers and thus run down through them to reach the root system of the plant.

The long, thin and generally uniform size of fibers 34 of landscape material 28 also enables the landscape material of the present invention to be more desirable to the touch for certain users when handling the material. More particularly, long, thin fibers 34 of landscape material 28 are softer than prior art shredded and splintered mulch fibers, which is preferable for certain users In addition, long, thin fibers 34 of landscape material 28 have a generally uniform, and therefore more desirable, appearance than prior art mulch fibers. That is, fibers 34 that are generally more uniform in appearance tend to be more desirable to certain users, and the shaving/slicing method used to form landscape material 28 of the invention provides a more uniform fiber size than the chipping and shredding processes that are used to form prior art mulch fibers Moreover, the above-described preferred dimensions of fibers 34 of landscape material 28 of the invention enable the material to readily be placed in bags 32 (FIG. 1), bales or bulk form for sale to users, and in turn handled more easily than the prior art mulch fibers upon removal from the bags or bales Furthermore, fibers 34 of landscape material 28 of the present invention are large enough to resist decomposition that may be considered premature by many users. That is, fibers 34 of landscape material 28 are large enough to resist substantial decomposition, after placement around a tree, bush, etc., for at least one growing season. Fibers 34 of landscape material 28 also allow the material to be lighter in weight, and thus more easily handled, than the landscape material of the prior art.

The present invention also includes a method for making landscape material 28. The method comprises the making of landscape material 28 in accordance with the steps presented above. For example, a wood section 10 is placed on a processing machine 12 that cuts the wood section to produce a long wood ribbon 22. The wood ribbon 22 preferably is reduced in length to fibers 34, which preferably are colored, thereby producing landscape material 28 having a size in the exemplary ranges that are described above.

Landscape material 28 of the invention includes fibers 34 that are thinner, or have a smaller cross-sectional area, than prior art mulch fibers, while being as long or longer than the prior art fibers. This structural advantage of landscape material 28 enables multiple desirable characteristics of the present invention. For example, a smaller cross-sectional area enables easier placement of landscape material 28 about a bush, tree, plant, or other object, as well as placement of a greater number of fibers 34 when compared to prior art mulch fibers. These placement advantages in turn enable landscape material 28 of the present invention to provide increased coverage of the soil, thereby desirably allowing moisture to pass through to the soil and root system, retaining the moisture in the soil, and reducing the ability of undesirable weeds to grow.

Long fibers 34 of landscape material 28, with a reduced cross-sectional area, also enable the material of the present invention to be softer and lighter than prior art mulch fibers, thereby being easier to handle In addition, fibers 34 of landscape material 28 of the invention have a generally more uniform size and cross-sectional area, and therefore a more uniform appearance than prior art mulch fibers, which is more desirable to certain users of the material. Moreover, the fibers of landscape material 28 of the present invention are large enough to resist premature decomposition.

Landscape material 28 may be formed from sources other than wood sections 10, as known to those skilled in the art, without affecting the concept or operation of the invention For example, recycled materials, such shipping pallets, may be used. In addition, forms of wood other than wood sections 10 may be used to form landscape material 28, such as wooden boards or slabs. Furthermore, slicing techniques other than those described above, such as slicing of the wood in one motion, rather than two, or slicing in a circular or rotary motion, rather than a linear motion, may be used to form landscape material 28 without affecting the concept or operation of the invention It is to be noted that the dimensions provided herein for the cross-sectional area and the length of fibers 34 of landscape material of the present invention 28 are by way of example, as these dimensions may vary based upon the application without affecting the overall concept or operation of the invention In the foregoing description, certain terms have been used for brevity, clarity and understanding; but no unnecessary limitations are to be implied therefrom beyond the requirements of the prior art, because such terms are used for descriptive purposes and are intended to be broadly construed. Moreover, the present invention has been described with reference to an exemplary embodiment. It shall be understood that this illustration is by way of example and not by way of limitation Potential modifications and alterations will occur to others upon a reading and understanding of this disclosure, and it is understood that the invention includes all such modifications and alterations and equivalents thereof. For example, the arrangement of steps set forth above may be modified, adjusted, or rearranged, without affecting the overall concept or operation of the invention Accordingly, the landscape material and its method for manufacturing of the present invention is simplified, provides an effective, safe, inexpensive and efficient structure which achieves all the enumerated objectives, provides for eliminating difficulties encountered with prior art landscape material and methods for making such material, and solves problems and obtains new results in the art.

Having now described the features, discoveries and principles of the invention, the manner in which the improved landscape material is manufactured, constructed, arranged and used, the characteristics of the manufacture, construction and arrangement, and the advantageous, new and useful results obtained; the new and useful structures, devices, elements, arrangements, parts, combinations and methods are set forth in the appended claims.

What is claimed is:

1. A landscape material, consisting essentially of:
a plurality of flexible wood fibers, wherein each of said fibers in said plurality of fibers includes a length in a range of from about 3.0 inches to about 10.0 inches and a cross sectional area that includes at least one dimension in a range of from about 0.0625 inches to about 0.125 inches, each of said fibers in the plurality of fibers further including a cross section that is geometrically similar to a cross section of the other fibers in said plurality of fibers.

2. The landscape material of claim 1, wherein said generally uniform length of said fibers is in a range of from about 4.0 inches to about 6.0 inches.

3. The landscape material of claim 1, wherein said landscape material includes an additive.

4. The landscape material of claim 3, wherein said additive includes a colorant.

5. The landscape material of claim 3, wherein said additive includes a flame retardant.

6. The landscape material of claim 3, wherein said additive includes a horticultural chemical.

* * * * *